US008909547B2

(12) United States Patent
Bohen et al.

(10) Patent No.: US 8,909,547 B2
(45) Date of Patent: Dec. 9, 2014

(54) HANDHELD ORDER UNIT AND CASH HANDLING DEVICE

(75) Inventors: Daniel Christopher Bohen, Charlotte, NC (US); Amy Baker Folk, Charlotte, NC (US); William Thomas Sanders, Denver, NC (US); Shane Anthony Johnson, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 27 days.

(21) Appl. No.: 13/118,669

(22) Filed: May 31, 2011

(65) Prior Publication Data

US 2011/0231309 A1    Sep. 22, 2011

Related U.S. Application Data

(62) Division of application No. 12/254,533, filed on Oct. 20, 2008, now Pat. No. 8,781,903.

(51) Int. Cl.
*G06Q 20/20* (2012.01)
*G07G 1/14* (2006.01)
*G06Q 20/04* (2012.01)
*G06Q 20/40* (2012.01)
*G06Q 20/10* (2012.01)
*G06Q 40/02* (2012.01)
*G06Q 30/06* (2012.01)

(52) U.S. Cl.
CPC .................. *G06Q 40/02* (2013.01); *G07G 1/14* (2013.01); *G06Q 20/202* (2013.01)
USPC .................. 705/17; 705/15; 705/39; 705/42; 235/383

(58) Field of Classification Search
USPC ....................................... 705/15, 42
See application file for complete search history.

(56) References Cited

U.S. PATENT DOCUMENTS

| | | | |
|---|---|---|---|
| 4,634,845 A | 1/1987 | Hale et al. | |
| 4,689,478 A | 8/1987 | Hale et al. | |
| 5,003,472 A | 3/1991 | Perrill et al. | |
| 5,157,717 A | 10/1992 | Hitchcock | |
| 5,640,002 A | 6/1997 | Ruppert et al. | |
| 5,850,077 A | 12/1998 | Tognazzini | |
| 6,314,406 B1 | 11/2001 | O'Hagan et al. | |
| 6,587,835 B1 | 7/2003 | Treyz et al. | |
| 6,616,049 B1 | 9/2003 | Barkan et al. | |
| 6,880,750 B2 | 4/2005 | Pentel | |
| 6,920,431 B2 | 7/2005 | Showghi et al. | |
| 7,044,365 B2 | 5/2006 | Witherspoon | |
| 7,110,963 B2 | 9/2006 | Negreiro | |
| 7,234,640 B2 | 6/2007 | Pentel | |
| 2002/0026364 A1* | 2/2002 | Mayer et al. ................ | 705/15 |
| 2002/0050526 A1 | 5/2002 | Swartz et al. | |
| 2003/0014330 A1* | 1/2003 | Showghi et al. ............ | 705/26 |

(Continued)

*Primary Examiner* — Matthew Gart
*Assistant Examiner* — Reva R Danzig
(74) *Attorney, Agent, or Firm* — Banner & Witcoff, Ltd.; Michael A. Springs

(57) ABSTRACT

Methods and devices allow a handheld order unit to be used with a cash handling device. A handheld order unit may be used by a staff person to enter order information, to display an amount due for the meal or other transaction, to facilitate payment, to print receipts, and to communicate information about the transaction to a cash handling device. The cash handling device may identify the handheld order unit and the assigned user for the unit and determine what financial documents need to be inserted by the user for reconciliation purposes.

12 Claims, 5 Drawing Sheets

(56) References Cited

U.S. PATENT DOCUMENTS

| | | |
|---|---|---|
| 2003/0061113 A1 | 3/2003 | Petrovich et al. |
| 2003/0154131 A1 | 8/2003 | Tsang |
| 2004/0034564 A1 | 2/2004 | Liu |
| 2004/0039661 A1 | 2/2004 | Fuzell-Casey et al. |
| 2004/0054592 A1* | 3/2004 | Hernblad ................. 705/15 |
| 2004/0064413 A1* | 4/2004 | Mtzig et al. ............... 705/42 |
| 2005/0097046 A1 | 5/2005 | Singfield |
| 2006/0149640 A1 | 7/2006 | Gordon et al. |
| 2006/0208063 A1* | 9/2006 | Patel et al. ............... 235/380 |
| 2006/0283935 A1* | 12/2006 | Henry et al. ............. 235/380 |
| 2008/0005036 A1 | 1/2008 | Morris |
| 2008/0040240 A1 | 2/2008 | Covington et al. |
| 2008/0126985 A1 | 5/2008 | Baril et al. |

* cited by examiner

HANDHELD ORDER UNIT AND CASH HANDLING DEVICE

RELATED APPLICATIONS

This application is a divisional application based on U.S. application Ser. No. 12/254,533, filed Oct. 20, 2008, entitled "Handheld Order Unit and Cash Handling Device." The content of the aforementioned application is hereby incorporated by reference in its entirety.

BACKGROUND

Handheld order-taking systems are used in bars, restaurants, and stadiums to gather customer order information and send the information directly to fulfillment such as, for example, a kitchen or bartender. This technology allows customers to be processed quickly and eliminates the need for cashiers to double enter orders such as, for example, one time at the customer's table and again at an order entry station. In spite of these efficiencies, reconciliation redundancy still exists. Staff must facilitate payments out of a point of sale cash register either throughout a shift or at the end of a shift. Management is required to balance out cashiers individually and then balance out registers as an additional activity at the end of the shift.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

In one embodiment, a handheld order unit may be used to allow staff to remotely process payments, further increasing efficiency by eliminating the point of sale cash register. Cash recyclers could also be utilized to build individual staff change banks at the start of shift. Information can be shared between the remote order taking units and a cash recycler to enable quick reconciliation of staff activity at the end of the shift.

In another embodiment, a handheld order unit may be used with a cash handling device. A handheld order unit may be used by a staff person to enter order information, to display an amount due for the meal or other transaction, to facilitate payment, to print receipts, and to communicate information about the transaction to a cash handling device. The cash handling device may identify the handheld order unit and the assigned user for the unit and determine what financial documents need to be inserted by the user for reconciliation purposes.

In a further embodiment, a cash handling device and a handheld order unit are provided. The handheld order unit is assigned to a user. The user may enter order information into the handheld order unit. Order information may be communicated from the handheld order unit to the cash handling device. The handheld order unit may display to the user an amount due for the meal or other transaction. Payment information may be entered into the handheld order unit by the user. The handheld order unit may also help facilitate the payment such as, for example, by allowing a credit or debit card to be swiped and by printing a receipt as well as a credit or debit slip. A reconciliation may take place between the cash handling device and the handheld order unit.

In yet another embodiment, a system may include a cash handling device such as, for example, a cash recycler, as well as a handheld order unit. The cash handling device and the handheld order unit may both include memory, a display, an input means, and a communication means. The cash handling device may also include one or more stackers for storing financial documents such as, for example, currency of different denominations, checks, credit card slips, and debit card slips. The cash handling device may also include containers for storing coins. The cash handling device may also include a scanner that may scan and may differentiate between different financial documents and bills of different denominations. The cash handling device may also include an input mechanism to receive financial documents that are deposited into the cash handling device. Computer executable instructions may cause the cash handling device to identify a user of the handheld order unit, to receive order information from the handheld order unit, to receive payment information from the handheld order unit, to determine reconciliation information for the user of the handheld order unit, to display said reconciliation information to the user, to allow said financial documents to be input to the input mechanism, to scan said financial documents with the scanner, and to route said financial documents to the appropriate one of said plurality of stackers. Computer executable instructions may cause the handheld order unit to allow selection of the user of the handheld order unit, to allow entry of the order information, to display billing information, to allow entry of the payment information, and to communicate the order information and the payment information to the cash handling device.

In still another embodiment, the cash handling device may be a cash recycler.

Additional features and advantages of the invention will be apparent upon reviewing the following detailed description.

BRIEF DESCRIPTION OF THE DRAWINGS

The present disclosure is illustrated by way of example and not limited in the accompanying figures in which like reference numerals indicate similar elements.

DETAILED DESCRIPTION

In accordance with various aspects of the disclosure, systems and methods are illustrated for utilizing a handheld order unit in conjunction with a cash handling device.

Aspects of the present disclosure relate to cash handling devices. Cash handling devices generally refer to devices that are configured to accept and/or dispense currency. Cash handling devices include payment kiosks, point of sale systems such as cash registers, automated teller machines (ATMs), currency recyclers and the like. Currency recyclers generally refer to cash handling devices that are configured to dispense the same currency that was earlier deposited. For example, if a user deposits a 5 dollar bill into a cash recycler machine, the same 5 dollar bill may be dispensed during a subsequent withdrawal transaction. Thus, using currency recyclers, deposited currency may be placed immediately back into use and circulation instead of being held or frozen until a bank is able to collect and reconcile the funds, stored indefinitely and/or taken out of circulation entirely as is the case with other current cash handling devices.

Figure 1:
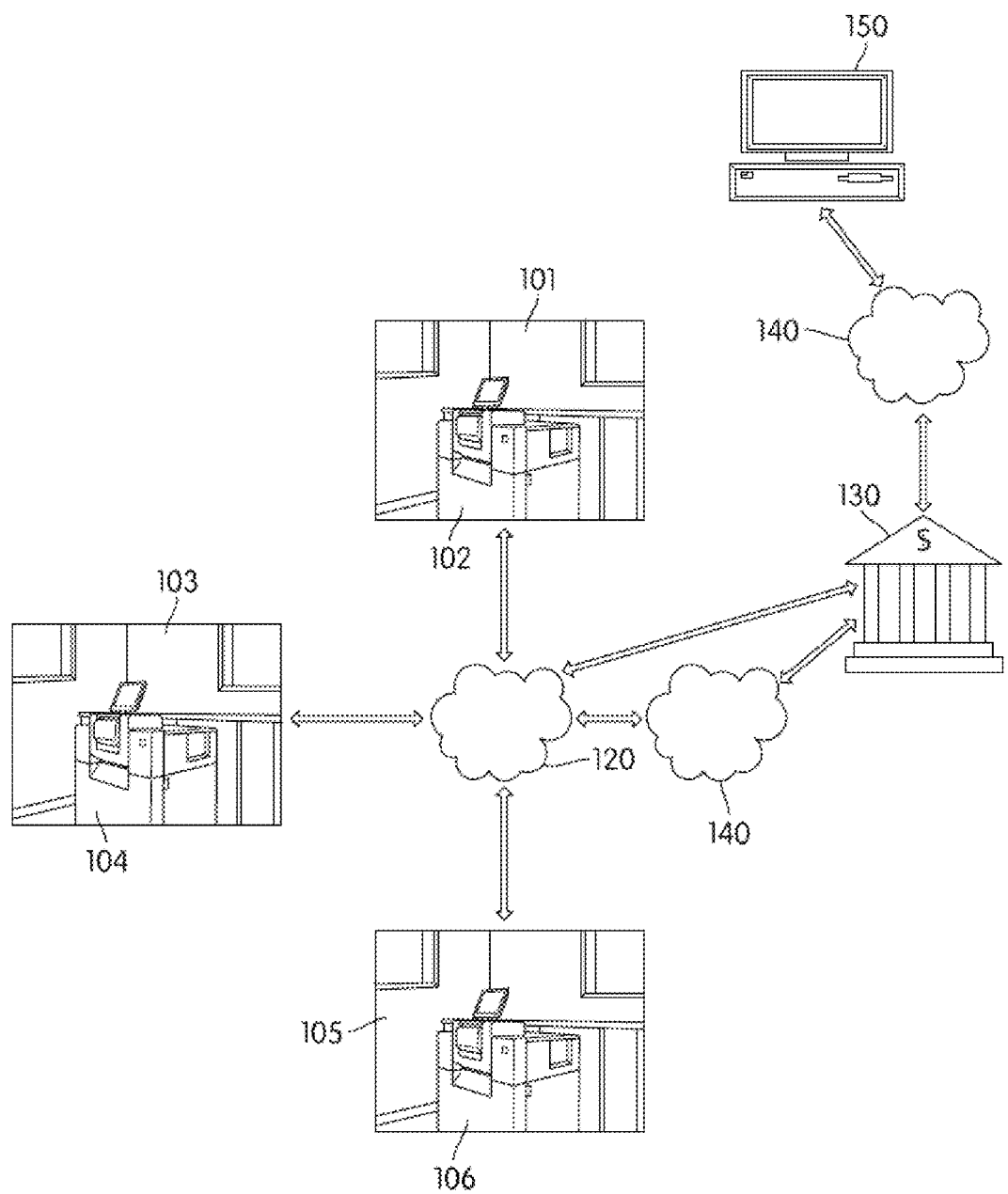
FIG. 1 illustrates an example of a suitable operating environment in which various aspects of the disclosure may be implemented.

FIG. 1 illustrates an example of a suitable operating environment in which various aspects of the disclosure may be implemented. Devices 102, 104, 106 may include currency recyclers and/or other cash handling devices and may be located at various sites such as locations 101, 103, and 105. The locations may represent different stores of a business enterprise. For example, locations 101, 103, and 105 may represent three different grocery stores located in different geographical areas belonging to a grocery store chain. Those skilled in the art will realize that additional cash handling devices may be located in the same store or in other stores belonging to the grocery store chain. In addition, those skilled in the art will realize that a grocery store chain is only one illustrative example of the types of locations or businesses that cash handling devices such as recyclers may be located. For example, cash recyclers may also be located in gas stations, post offices, department stores, and other places where cash and other financial instruments are deposited or withdrawn.

FIG. 1 further illustrates that cash handling devices 102, 104, and 106 may be connected to a communications network such as communications network 120. Communications network 120 may represent: 1) a local area network (LAN); 2) a simple point-to-point network (such as direct modem-to-modem connection); and/or 3) a wide area network (WAN), including the Internet and other commercial based network services.

Cash handling devices 102, 104, and 106 may communicate with one another or with a financial institution such as bank 130 via communication network 120 in various manners. For example, communications between cash handling devices 102, 104, 106 and bank 130 may use protocols and networks such as TCP/IP, Ethernet, FTP, HTTP, BLUETOOTH, Wi-Fi, ultra wide band (UWB), low power radio frequency (LPRF), radio frequency identification (RFID), infrared communication, IrDA, third-generation (3G) cellular data communications, Global System for Mobile communications (GSM), or other wireless communication networks or the like. Communications network 120 may be directly connected to a financial institution such as bank 130. In another embodiment, communications network 120 may be connected to a second network or series of networks 140 before being connected to bank 130. According to one or more arrangements, bank 130 may utilize an infrastructure which includes a server 150 having components such as a memory, a processor, a display, and a communication interface.

Cash recycler 200 may further provide display 213 to present data and/or messages to a user. For example, display 213 may be configured to display a recycler balance, a transaction interface, a current deposit count, security options, transportation options and the like.

One or more input devices 254 such as an antenna, serial port, infrared port, Bluetooth module, firewire port, keypad, keyboard, mouse, touchscreen, fingerprint scanner, retinal scanner, proximity card reader, RFID scanner and/or writer, magnetic card reader, barcode reader, and/or combinations thereof, or any other type of input device or reader capable of inputting to, communicating with, or reading from a handheld order unit 400, may also be included in or connected to recycler 200.

Figure 4:
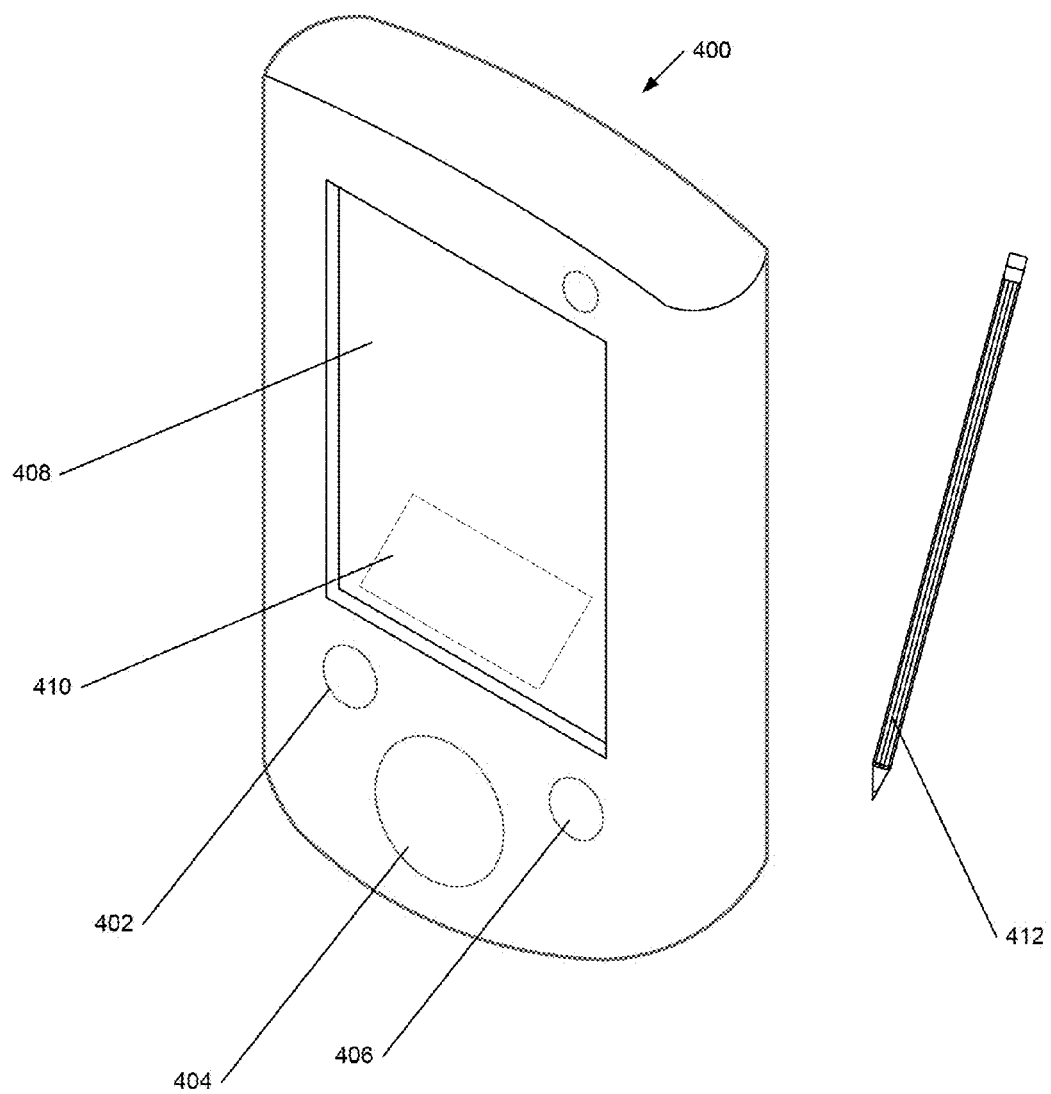
FIG. 4 illustrates a sample handheld order unit that may be used in conjunction with the present invention.

As shown in FIG. 4, the handheld order unit 400 may include one or more buttons or multidirectional keypads 402, 404, 406 in order to facilitate entry of information into the unit 400. A touchsensitive screen 408 may allow information to be entered by or displayed to a user. The touchsensitive screen 408 may also include an area 410 for a virtual keyboard or handwriting area in which the user may handwrite information using a stylus 412. The handheld order unit 400 may communicate with the cash handling device via any type of wired or wireless communication port, protocol, or coupling (not shown). Sample wired connections include serial interfaces, parallel interfaces, USB, firewire, and Ethernet connections. Sample wireless connections includes WiFi such as IEEE standard 802.11a, 802.11b, 802.11g, and 802.11n as well as Bluetooth, infrared, and other radiofrequency protocols. Sample handheld order units 400 suitable for use with the present invention may be obtained from a variety of sources. The handheld order unit 400 may also include a magnetic strip reader for swiping credit cards as well as a printer for printing bills or receipts.

One of printers 256 may also be included in or connected to recycler 200 for printing receipts and notifications as well.

In cash recycler 200, stackers 217 and cartridges 215 are configured to store currency.

Currency may be inserted through input slot 209 and withdrawn through withdrawal slot 211. Stackers 217 may be used to store and organize currency based on denomination. For example, all $5 bills may be stored in stacker 2 (i.e., stacker 217B) while all $20 bills may be stored in stacker 3 (i.e., stacker 217C). Cartridges 215A and 215B, on the other hand, may be used to store overflow currency and/or currency for transport. Thus, if stackers 217 become full, additional currency that is deposited into recycler 200 may be stored in an overflow cartridge such as cartridge 215B. One of cartridges 215 may be designated as a transport cartridge that stores currency to be withdrawn from the machine and transported to the bank. Alternatively or additionally, one or more of cartridges 215 may be used as an unfit bill store for currency determined to be defective to a degree that it should be taken out of circulation. Cartridges 215 and stackers 217 may further be removable for easier access or transport.

Scanning unit 207 may be configured to scan each bill or currency that is inserted into recycler 200. Scanning unit 207 may be configured to detect defects, unauthorized reproductions, denomination, type of currency (e.g., which country the currency originates from) and the like. Scanning unit 207 may further be configured to refuse money (either through input slot 209 or withdrawal slot 211) if it cannot be properly recognized or if the currency is deemed to be an unauthorized reproduction. Scanning unit 207 may send such data to processor 201 which may, in turn, save the data in memory 203.

Further, recycler 200 may include one or more mechanical or electromechanical systems (not shown) for automatically transferring currency between stackers 217, cartridges 215, input slot 209 and withdrawal slot 211 in recycler 200. For example, currency may automatically be withdrawn from stackers 217 and directed into cartridge 215A for storage using a series of motorized rollers. In another example, currency stored in cartridge 215A may be withdrawn and organized and stored into stackers 217 according to denomination. Using such systems to facilitate the automated movement of currency between storage components and other portions of recycler 200 may provide efficiency and security by alleviating some of the need to manually handle currency stored within recycler 200.

Figure 2:
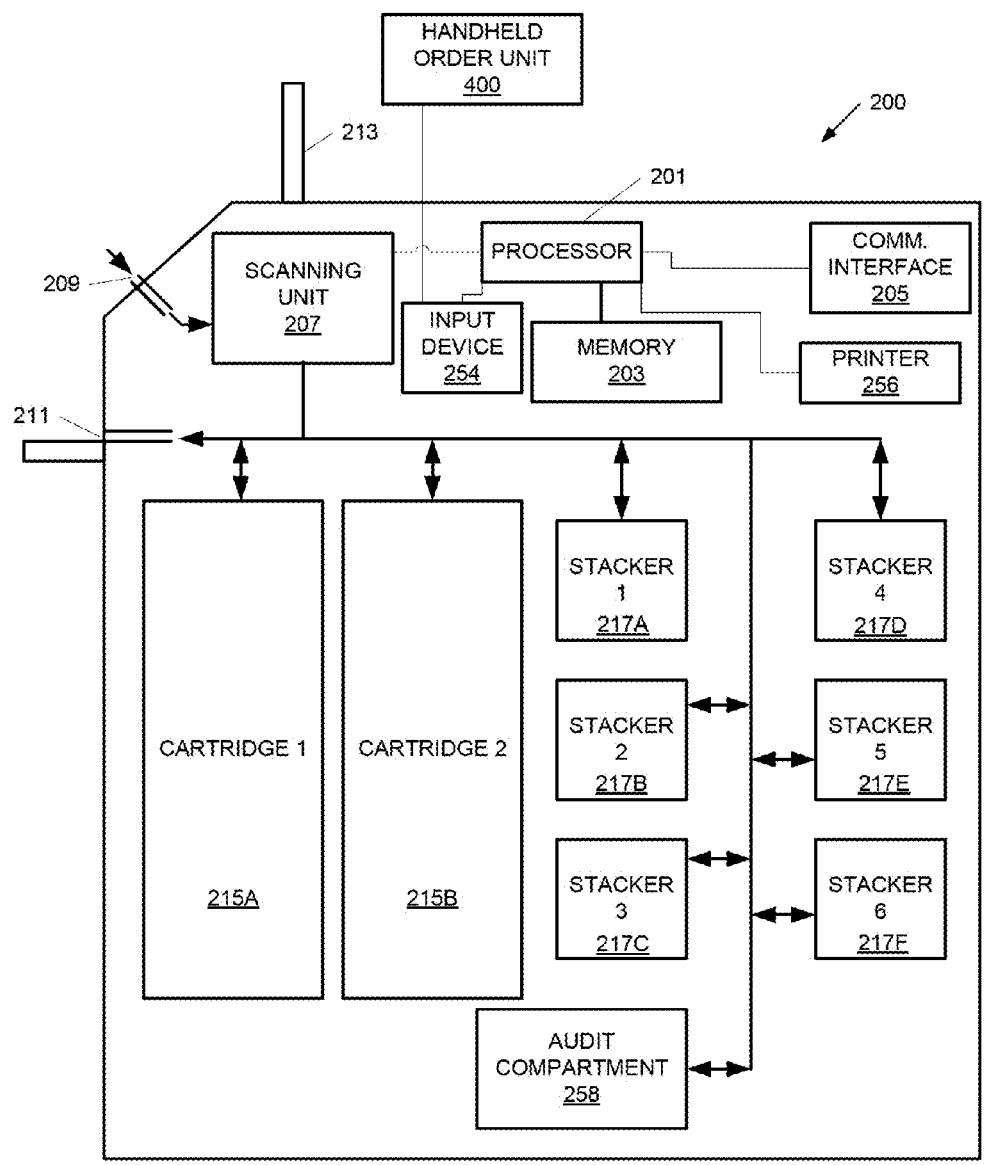
FIG. 2 illustrates a simplified diagram of a cash handling device in accordance with an aspect of the invention.
Figure 3:
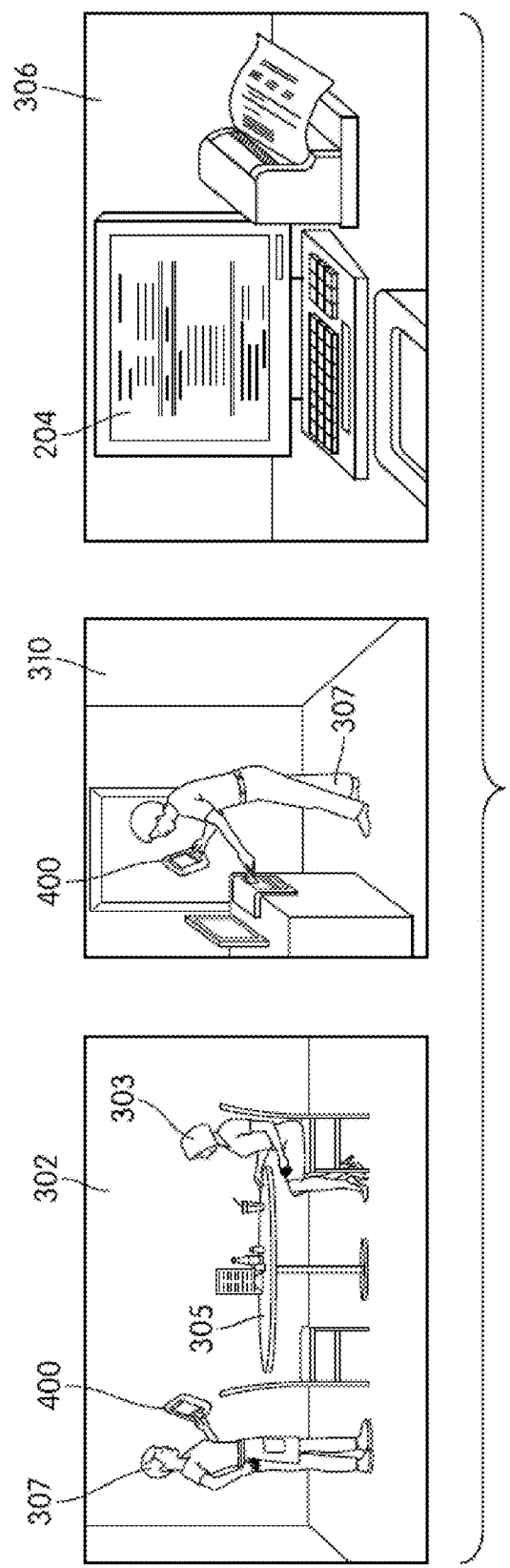
FIG. 3 illustrates various features of cash handling devices and associated handheld order units that may be used in accordance with aspects of the invention.

FIG. 3 illustrates various features of a handheld order unit 400 used in conjunction with a cash handling device, such as cash recycler 200 of FIG. 2.

The images in FIG. 3 depict use of a handheld order unit 400 and cash handling device 200 in a restaurant or similar environment. In image 302, a waiter or waitress 307 is holding a handheld order unit 400 while taking an order from a customer 303 sitting at table 305. The waiter or waitress 307 may enter an order into the handheld order unit 400. The handheld order unit 400 or a remote computer may calculate the amount of money due and print a bill for the customer 303. At an appropriate time, the waiter or waitress 307 may present the bill to the customer 303 for payment. The customer 303 may pay for the restaurant bill with cash, coins, check, or credit card. The waiter or waitress may input into the handheld order unit 400 whether the customer paid with cash, coins, check, or credit card. The process may be repeated any number of times depending on the number of customers that the waiter or waitress is servicing at the restaurant.

In images 310 and 306, the waiter or waitress 307 may walk to a location in the restaurant in which the cash handling device 200 is located. The handheld order unit 400 may communicate with the cash handling device 200, which may then prompt 204 the waiter or waitress 307 on display 213 to enter the appropriate cash, coins, checks, or credit card slips into cash handling device 200.

For example, after initiating communication between the cash handling device 200 and the handheld order unit 400, the cash handling device 200 might note for reconciliation purposes how much cash and coins have been collected by the waiter or waitress 307. In addition, the cash handling device might note how many checks and credit card slips had been collected as well as the amount of each check. The cash handling device may then proceed to instruct the waiter or waitress 307 to enter the appropriate amount of cash and coins as well as the identified checks and credit card slips. The cash handling device 200 may perform these prompts in a specific order, if desired.

In an aspect of the invention, the cash handling device 200 may also be connected to a financial institution via communication network 120. This may enable the financial institution to monitor on a real time or periodic basis how much cash or currency is contained in the cash handling device 200.

Figure 5:
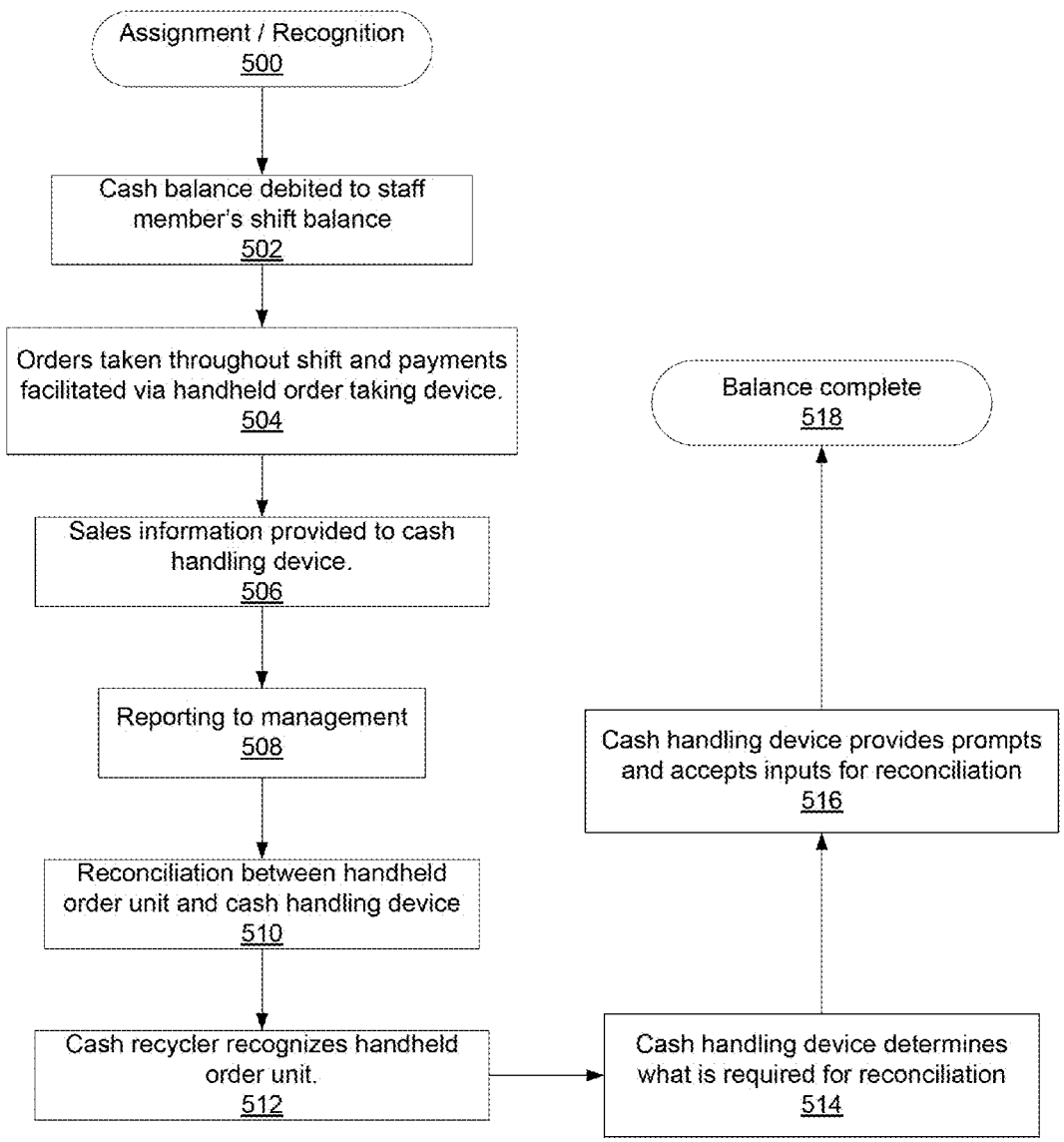
FIG. 5 illustrates an example method of utilizing a handheld order unit in conjunction with a cash handling device.

FIG. 5 illustrates an example method of utilizing a handheld order unit 400 in conjunction with a cash handling device 200.

At the start 500 of the process, one or more handheld units 400 may be assigned to one or more staff 307. The assignments may be temporary or persistent in nature. If temporary, each handheld order unit may be assigned at specific intervals such as, for example, at the beginning or end of a shift. The assignments may be made locally on each handheld order unit 400 such as, for example, by selecting on the unit 400 which staff person 307 will be the user for the shift. Alternatively, the assignments may be made at the cash handling device 200. Another option is for the cash handling device 200 to recognize the handheld order unit and its corresponding staff user.

If desired, a cash balance may be debited to a staff member's shift balance 502. Currency and coins may be dispensed to the staff member from cash handling device 200 as part of this step. The currency and coins may be used by the staff member to provide change at a customer's table when a bill is paid.

Orders may be taken throughout the shift by the staff member 504. In addition, payments may be facilitated or accepted via the handheld order unit 400 during the shift. The payments may be made by cash, coins, check, debit card, or credit card.

Sales information may be provided 506 to the cash handling device 200. For example, real time sales information may be sent wirelessly to the cash handling device. Alternatively, sales information may be stored on the handheld order unit 400 and later synchronized or communicated to the cash handling device 200 at the end of the shift or another convenient time.

If desired, real time, periodic, or on demand reporting may be made available to local management, corporate management, or a remote financial institution 508.

At the end of a shift or another desired time, a staff member may take the handheld order unit 400 to the cash handling device 200 in order to perform reconciliation 510. The cash handling device 200 may recognize the handheld order unit 400 in a variety of ways 512. For example, the recognition may occur with or without user invention. User intervention may take place by having the staff person 307 manually enter his or her user identity into the cash handling device 200. Alternatively, recognition may occur in a more automated fashion such as, for example, by use of an RFID tag on the handheld order unit 400, by scanning of a bar code on the unit 400, by reading a proximity card embedded in the unit 400, and the like.

After identifying the user and determining what is required in order to reconcile the user for the applicable period of time 514, the cash handling device 200 can then prompt the user for and accept entry of the appropriate amount of currency, coins, checks, credit cards slips, and debit card slips 516. The appropriate amount of money may equal, for example, the starting bank plus the customer payments.

Although the foregoing example explains how a cash handling device and handheld order unit might be used to reconcile activities of wait staff in a restaurant, bar, retail, or similar environment, persons of skill in the art will understand that this concept could also be applied to any business that has employees making deliveries and accepting payments locally or remotely such as, for example, pizza delivery, package delivery, and the like.

Although not required, one of ordinary skill in the art will appreciate that various aspects described herein may be embodied as a method, a data processing system, or as one or more computer-readable media storing computer-executable instructions. Accordingly, those aspects may take the form of an entirely hardware embodiment, an entirely software embodiment or an embodiment combining software and hardware aspects. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the invention have been described in terms of illustrative embodiments thereof Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

We claim:

1. A system comprising:
   a handheld order unit; and
   a cash handling device comprising:
      a first processor for executing first computer-executable instructions;
      first memory that stores the first computer-executable instructions;
      a first display;
      a first input component for receiving user input;
      a scanner;
      a first communication component to communicate with the handheld order unit; and
      an input component to receive payments,
   wherein the first computer executable instructions cause the cash handling device to:
      identify a user of the handheld order unit from a plurality of users,
      receive order information from the handheld order unit,
      receive payment information from the handheld order unit,
      selectively determine reconciliation information for the user of the handheld order unit via RFID recognition for a period of time from a plurality of order information, and
      display said reconciliation information to the user,
   wherein the handheld order unit comprises:
      a second processor for executing second computer-executable instructions;
      second memory that stores the second computer-executable instructions;
      a second display;
      a second input component for receiving user input;
      a printer; and
      a second communication component to communicate with the cash handling device,
   wherein the second computer executable instructions cause the handheld order unit to:
      select the user of the handheld order unit,
      allow entry of the order information,
      display billing information,
      print the billing information,
      allow entry of the payment information,
      communicate the order information and the payment information to the cash handling device, and
   wherein the first computer executable instructions further cause the cash handling device to:
      allow financial documents to be input to the input component; and
      scan at least one financial document input into the cash handling device, the at least one financial document including paper currency and at least one check.

2. The system of claim 1, wherein the at least one financial document further includes at least one of: a credit card slip and a debit card slip.

3. The system of claim 1, wherein the cash handling device further comprises a plurality of stackers to store said financial documents.

4. The system of claim 3, wherein said at least one financial document is routed to an appropriate stacker of the plurality of stackers containing similar financial documents.

5. The system of claim 1, wherein the handheld order unit further includes a magnetic card reader for accepting payments made with a credit card.

6. The system of claim 1, wherein said order information is reported to management.

7. The system of claim 1, wherein the input component is configured to receive financial documents that are deposited into a cash recycler.

8. The system of claim 7, wherein said financial documents include at least one of: $1 bills, $5 bills, $10 bills, $20 bills, $100 bills, checks, credit card slips, and debit card slips.

9. A method comprising:
   selecting, by a handheld order unit, a user of the handheld order unit;
   identifying, by a cash handling device, the user of the handheld order unit;
   identifying, by the cash handling device, an RFID tag associated with the handheld order unit;
   receiving, by the handheld order unit, order information from the user of the handheld order unit;
   receiving, by the cash handling device, and from the handheld order unit, the order information;
   displaying, by the handheld order unit, billing information;
   printing, by the handheld order unit, the billing information;
   receiving, by the handheld order unit, payment information from the user of the handheld order unit;
   receiving, by the cash handling device, and from the handheld order unit, the payment information;
   receiving, by the cash handling device, one or more financial documents inputted to an input mechanism of the cash handling device;
   scanning, by the cash handling device, the one or more financial documents inputted to the input mechanism of the cash handling device, the one or more financial documents including paper currency and at least one check;
   selectively determining, by the cash handling device, reconciliation information for the user of the handheld order unit for a period of time based on the order information and the payment information; and
   displaying, by the cash handling device, said reconciliation information to the user.

10. The method of claim 9, wherein the one or more financial documents further include at least one of: a credit card slip and a debit card slip.

11. The method of claim 9, further comprising routing, by the cash handling device, the one or more financial documents to an appropriate stacker of a plurality of stackers containing similar financial documents.

12. The method of claim 9, wherein the one or more financial documents include at least one of: $1 bills, $5 bills, $10 bills, $20 bills, $100 bills, checks, credit card slips, and debit card slips.

* * * * *